United States Patent Office 3,371,715
Patented Mar. 5, 1968

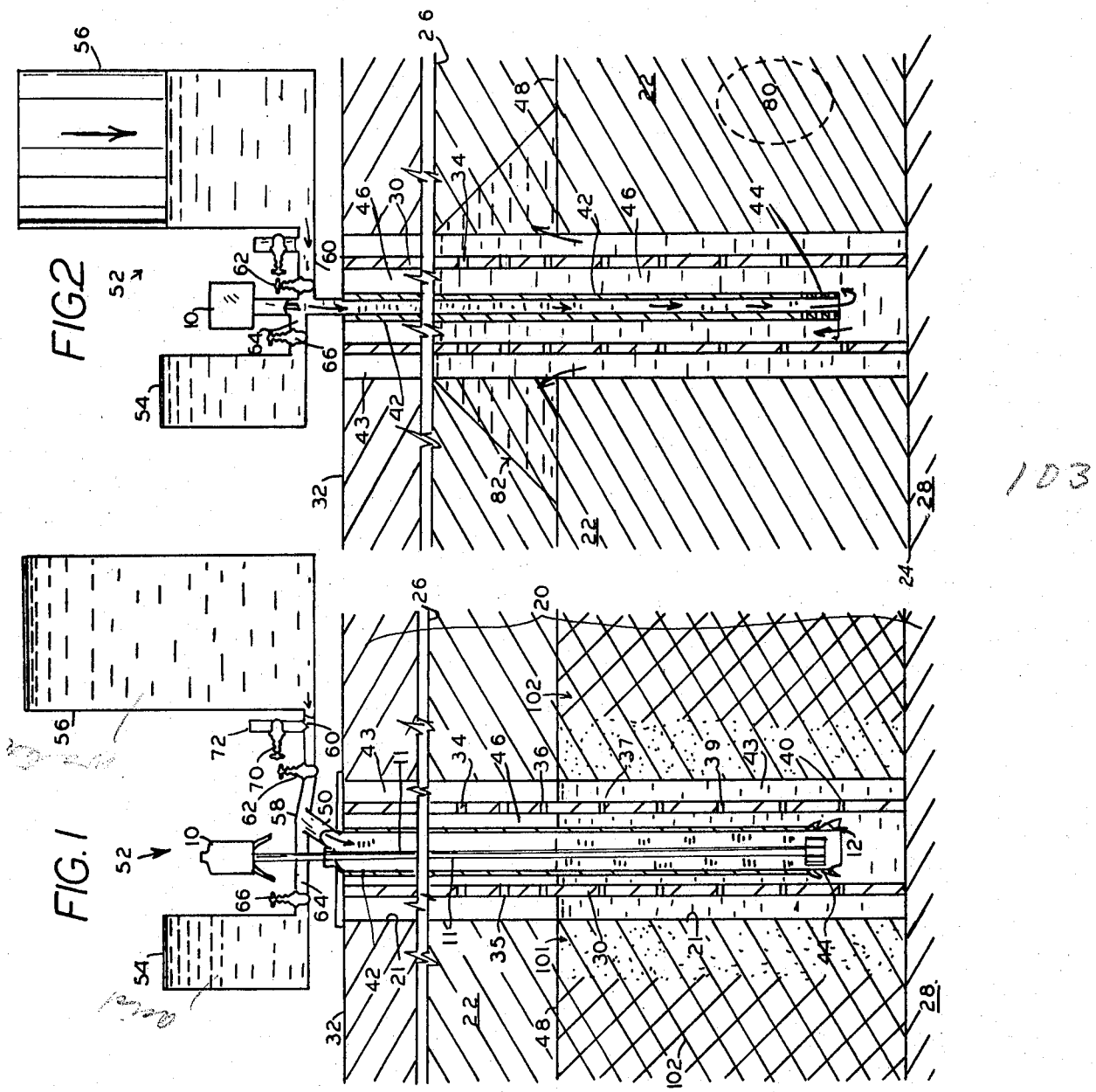
March 5, 1968      A. B. FLY ET AL      3,371,715
PROCESS OF TREATING A WATER BEARING FORMATION
Filed Sept. 20, 1965      4 Sheets-Sheet 1
INVENTORS
ANDERSON BILLY FLY AND WILLIAM D. MC DEARMAN JR.
BY
Ely Silverman
ATTORNEY

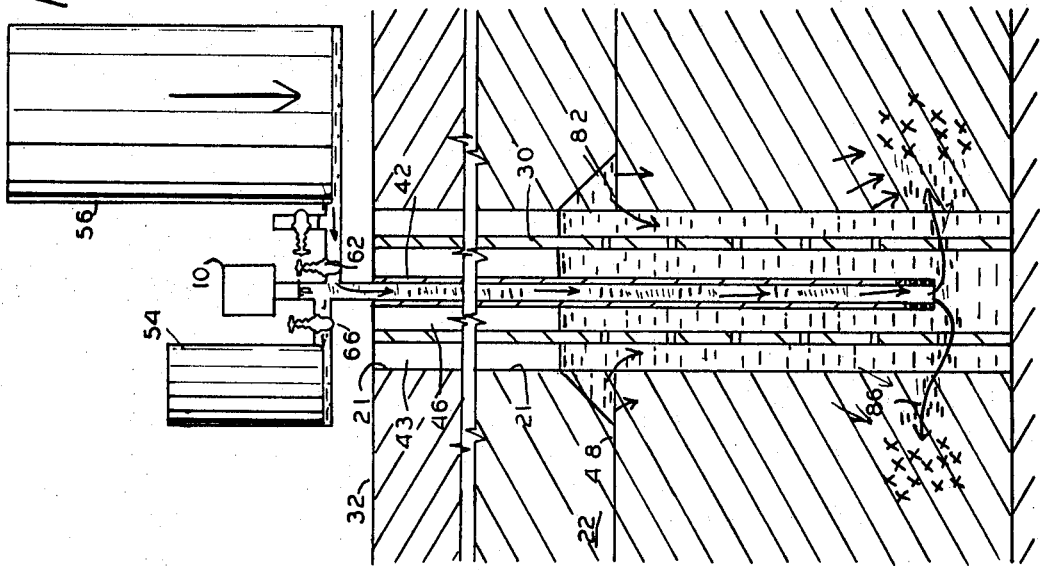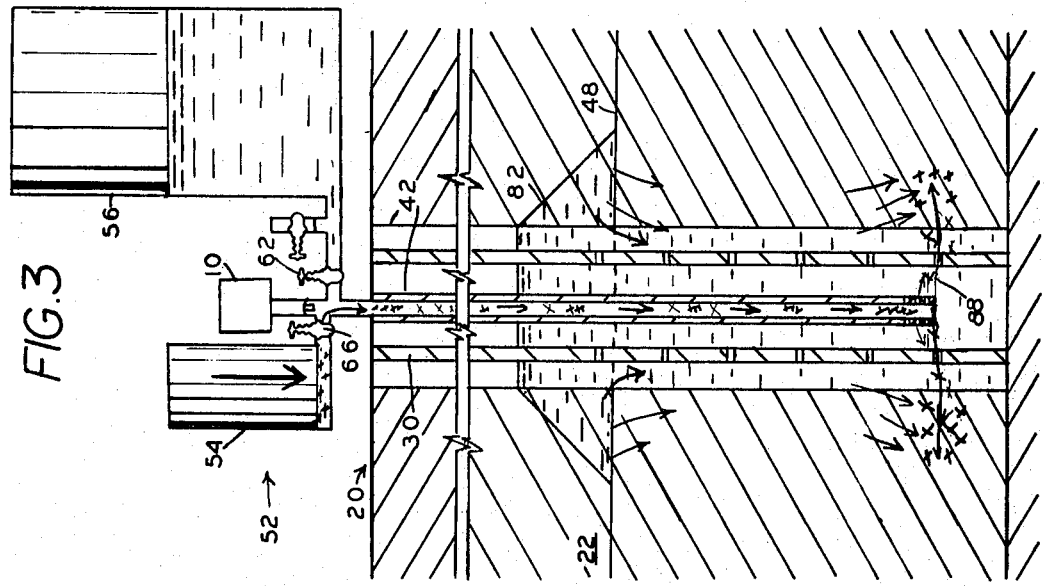

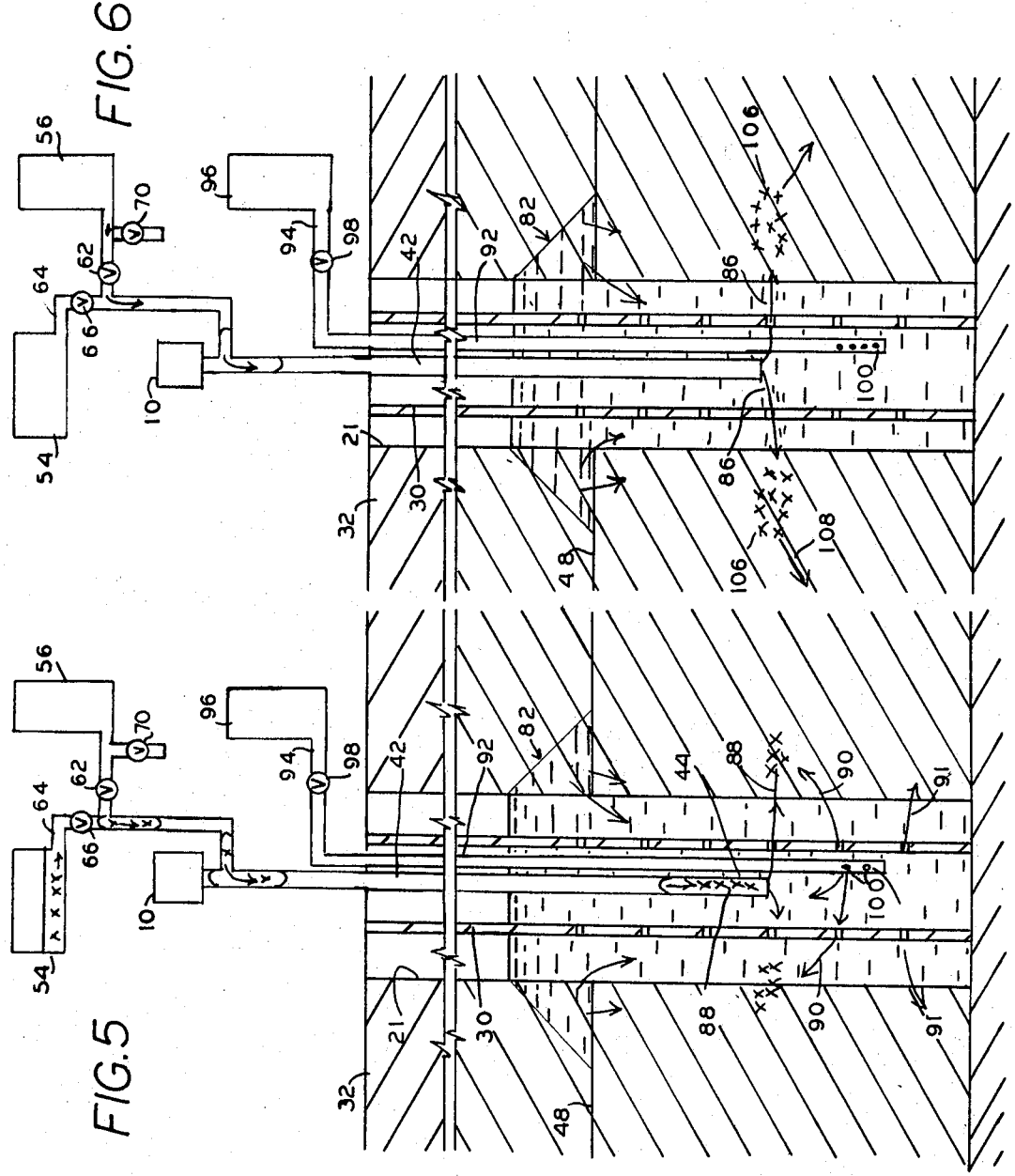

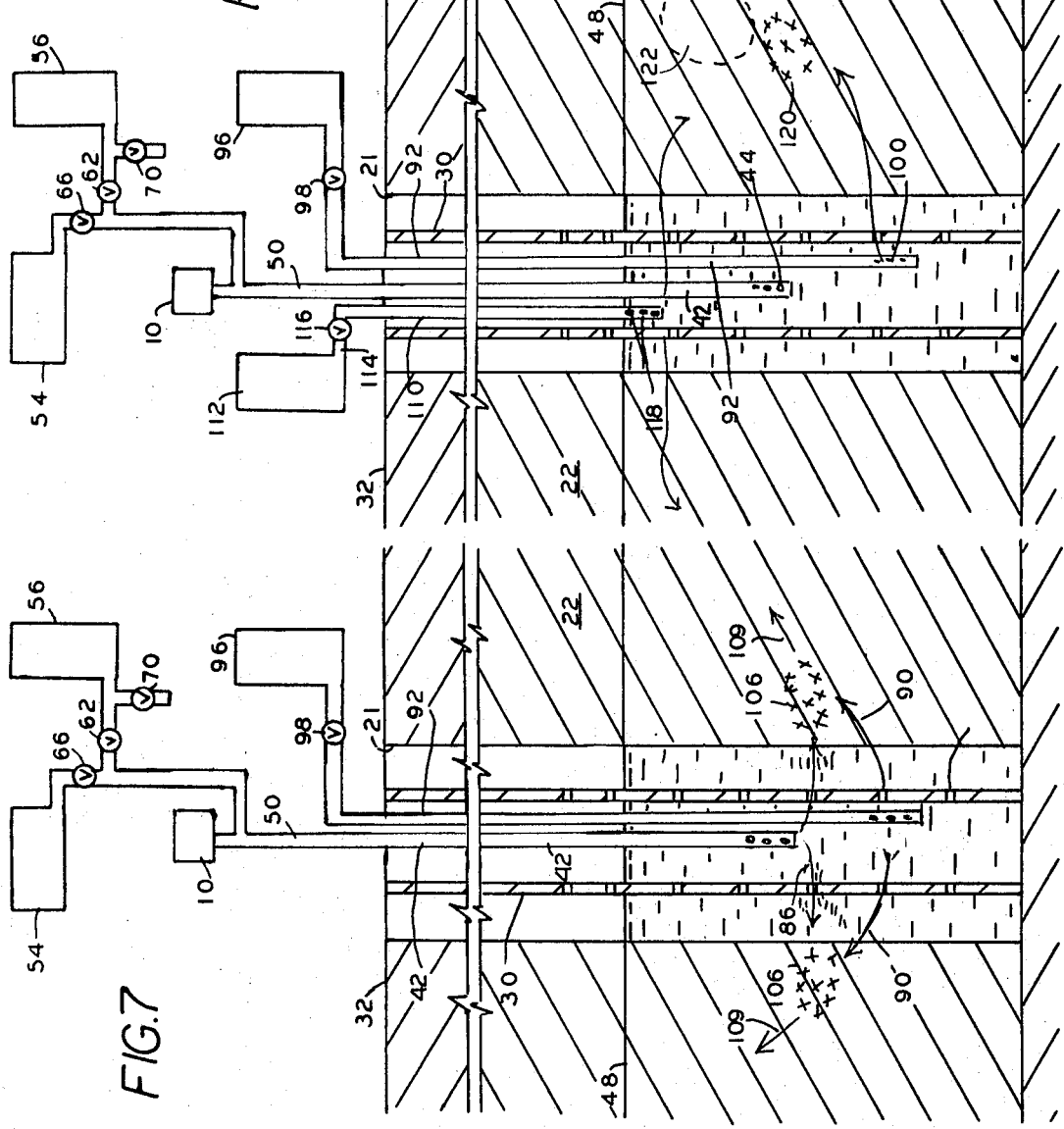

3,371,715
PROCESS OF TREATING A WATER BEARING FORMATION
Anderson Billy Fly and William David McDearman, Jr., Amarillo, Tex., assignors to Hydro-Jet Services, Inc., Amarillo, Tex., a corporation of Texas
Filed Sept. 20, 1965, Ser. No. 488,480
7 Claims. (Cl. 166—42)

ABSTRACT OF THE DISCLOSURE

This invention teaches treating zones radially distant from a single well bore by use of flow of liquid to control and direct the flow of treating agents to zones remote from a well bore.

BACKGROUND OF THE INVENTION

The prior art has, in treatment of wells provided for consumption of well treating agents in the zone adjacent the well bore of the formation treated (as zone 101 of FIGURE 1; this practice results in a repeated treatment of a zone determined by the volume of reagent used. This practice permits accumulation of debris blocking the production of the formation in zones peripheral to the treated zone (such as zone 102 of FIGURE 1) and requires subsequently larger treating volumes and expense of treatment to reach and act on the zones of the formation requiring treatment more peripheral of the well bore.

This invention provides an economical, efficient, convenient, and rapid method of treating zones radially distant from a single well bore using the flow of liquid as a directional barrier and guide to control and direct the flow of treating agents to zones remote from a well bore.

This invention also provides for vertically washing zones in underground formations radially remote from a single well bore.

SUMMARY

In a process from treating underground water-bearing formations adjacent to and radially spaced from a well bore, the well bore containing a perforated well casing passing through said formation and open thereto above and below the static water level in said formation and a conduit passes from the surface to said formation and within the said casing: the steps of passing water down the well bore and into said formation above said static water level, passing a limited amount of formation treating agent down said conduit and injecting said agent into said formation beneath said cone while liquid from said cone of water is flowing downward in said formation discontinuing the addition of the formation treating agent to said conduit and passing another liquid down the conduit and driving said treating liquid down said conduit and out of the conduit and into the formation while said cone of water theretofore above the static water level is flowing downward in said well and formation.

One object of this invention is to effectively, rapidly and efficiently and economically treat zones at a radial distance from a well bore in an underground formation.

Another object of this invention is to treat an underground formation zone at a radial distance from a well bore passing therethrough by a liquid moving in a direction parallel to the axis of the well bore using a single well bore.

A further object is to effectively treat a well using the equipment already in or attached to the bore quickly and conveniently.

Another object of this invention is to focus the action of a treating fluid on an underground formation zone radially distant from a well bore by using a balance of flow of fluids in an axial direction adjacent the well bore to direct treating fluid selectively to such zone.

The foregoing and other objects and advantages of this invention will become apparent to those skilled in the art on study of the following disclosure of which disclosure the accompanying drawings form a part and wherein like numerals refer to like parts throughout and wherein:

FIGURE 1 is a diagrammatic showing of a longitudinal section of a well in the first stage of its treatment according to one embodiment of this invention illustrating the first stage in the development of a "mound" and also showing the location of zones 101 and 102 above referred to in the description of the prior art;

FIGURE 2 is a showing as in FIGURE 1 in a stage of treatment subsequent to that shown in FIGURE 1 wherein the mound has been substantially completely formed;

FIGURE 3 is a showing as in FIG. 2 of a stage of treatment subsequent to that shown in FIGURE 2 and wherein the mound is being used to control the direction of initial flow of the injected treating agent and the formation treating agent is being injected into the formation;

FIGURE 4 is a showing as in FIGURE 2 of a stage of treatment subsequent to that shown in FIGURE 3 and wherein the formation treating agent is displaced into the formation by the fluid added from an above ground reservoir thereof;

FIGURE 5 shows diagrammatically a two-pipe system according to this invention whereby the level of the lines of flow of a treating liquor is located at a different level than in the process illustrated in FIGURES 1–4;

FIGURE 6 shows a variation of the process of FIGURE 5;

FIGURE 7 shows another variation of the process of FIGURE 5; and,

FIGURE 8 shows diagrammatically a three-pipe system whereby a zone radially removed from the well may be treated by movement of a liquid that moves in a vertical path.

This invention is largely used for treating irrigation wells such as well 20 below described. Little additional equipment is required. By this invention the usual irrigation pump for such irrigation wells is used. Such pump usually comprises a pump motor and housing 10, drive shaft 11, impeller blades in an impeller housing 12, and pump tubing 42, conventionally operatively connected. These elements are not disturbed and are in fact used in the well treatment according to this invention. The pump-tubing 42 is used to drive liquids down the well; the impeller blade housing is used as an outlet for the liquids driven down the tubing 42 and when the hydrostatic head of the fluid is not adequate, the pump motor may be used to drive liquids out of tubing 42 into the formation to be treated and/or up the casing to help form the mound as below described.

As brought out in the data of Table I herebelow, by the process of this invention a pump is not needed to drive the treating and driving liquids used from above ground assembly 52 to the formation being treated; gravity provides for adequately substantial flow rates (e.g. 400 to 1500 g.p.m. at heads of 160 to 500 feet of water) and improved well productivity. A jet pump may be used (in line 50) to increase flow rates.

In a particular preferred embodiment of this invention a well 20 is treated. The well 20 comprises bore 21, producing formation 22 (with a lower surface 24 and an upper surface 26) an impermeable formation 28 therebelow and a casing 30. Casing 30 is a hollow string of casing that extends from the bottom surface 24 of the formation to the ground surface 32. The casing 30 is provided with a plurality of perforations as 34–40 equispaced about the casing 30 to provide access of liquids from the formation 22 to the interior of the casing. A pump tubing line 42 extends from the surface to the bottom of the casing 30. A pump inlet casing 44 is located at and firmly attached to the line 42 at its bottom. An annular space 46 is provided between line 42 and the interior of casing 44. An annular space 43 is provided between the exterior of casing 44 and the well bore 21.

In the normal course of events, by the time action of the nature of this invention is required the level of water in the well is below the full height of the formation 26 with the result that there is a substantial height of porous formation above the static water level 48 of the formation 22. (Exemplary formation data are provided in Table I below.) However this does not affect the operation seriously as the operation herein performed may use any water permeable formation volume above the the static water level of the producing formation.

In operation the line 42 is connected by a feeder line 50 to a surface apparatus assembly 52. The assembly 52 comprises an acid reservoir tank 54, a water reservoir tank 56 and a T-shaped manifold line 58. Tank 56 is operatively connected to a water line 60, line 60 is connected to one end of discharge valve 62 at the outer end of line 60 and valve 62 is connected at its other end to manifold line 58. Tank 54 is operatively connected to an acid tank discharge line 64 and that line is operatively connected to acid discharge valve 66. Line 60 is connected by a T to a waste line valve 70. Valve 70 is attached to waste line 72.

As a preparatory step to the treatment of a zone 80 radially distant from the well bore 3,000 gallons of water are added to a casing bore 30 which, in this particular example has a 16″ diameter and a well bore diameter of 28″. The well depth, i.e. the depth of level 24 from level 32 is 300 feet. The valve 62 is then opened and valves 66 and 62 are closed. The important feature about this rate of addition is that it is sufficiently voluminous water is continued to be discharged by line 60 into space 46 and 43, valve 62 is closed and valve 66 is opened.

Closure of the valve 62 causes the mound 82 to collapse; the water therefrom passes into the bore 21 in large part. The acid which comes out of line 42 and casing 44 is at a slightly greater pressure within casing 46 than is the liquid driven by the collapse of the mound 82. However as the liquid coming from the mound area is at a greater presure than the liquid under only the static water level pressure the acid leaving the casing 44 does not travel upward but outward only. On delivery of the desired amount of acid from tank 54, valve 66 is closed and valve 62 again opened. This closure of valve 64 marks the end of the acid injection period (which lasts only from 2 to 6 minutes) during which about 2,000 gallons of acid is injected into the well.

The opening of the valve 62 marks the beginning of the displacement period. This water operates, at the bottom of the well to move outwards and also upwards. However the rate of flow is adjusted so that the still downwardly flowing liquid from the mound constrains the water immediately central to the acid just delivered to the bottom of the well from flowing upwards. Accordingly the liquid (water) moves out radially and forces the acid liquid in the interstices radial thereto to move radially outward into the formation 22 and thereby deliver that agent rapidly to and to concentrate the action of the acid (or other active agent) in a zone, as 80, radially distant from the well bore. For this purpose in an exemplary embodiment of the process 3,000 to 5,000 gallons of water are added in this period.

The above steps of injection of treating agent and displacement thereof to zone as 80 or 102 radially remote from the bore are accomplished within the period that the mound collapses which is a matter of minutes.

Data on exemplary embodiments of this process are given in Table I below. The acid used is 15% by weight aqueous hydrochloric acid with an inhibitor to minimize corrosion of the casing and tubing.

TABLE I.—DATA ON WELLS, TREATMENT AND RESULTS

| No. | Well | | | | | Treatment Data | | | | Treatment Results, G.p.m. production | |
|---|---|---|---|---|---|---|---|---|---|---|---|
| | Total Depth (ft.) | Static Water Level (ft.) | Diameter (inches) | | | Gals. mound Water | Gals. acid | G.p.m. injection | | Before | After |
| | | | Well | Casing | Pump | | | Water | Acid | | |
| 1o | 340 | 220 | 30 | 16 | 8 | 3,000 | 2,000 | 1,000 | 200 | 300 | 600 |
| 5w | 305 | 200 | 28 | 16 | 6 | 6,000 | 6,000 | 1,500 | 250 | 125 | 225 |
| 10n | 500 | 280 | 24 | 12¾ | 6 | 5,000 | 2,000 | 1,000 | 400 | 300 | 400 |
| 12D | 394 | 210 | 28 | 16 | 8 | 3,000 | 2,000 | 1,500 | 500 | 200 | 275 |
| 13H | 380 | 180 | 30 | 16 | 6 | 3,000 | 2,000 | 1,000 | 350 | 300 | 425 |
| 14h | 385 | 170 | 30 | 16 | 6 | 3,000 | 2,000 | 1,000 | 350 | 300 | 390 |
| 15H | 370 | 170 | 30 | 16 | 6 | 3,000 | 2,000 | 1,000 | 350 | 425 | 530 |
| 16H | 455 | 185 | 30 | 16 | 8 | 3,000 | 2,000 | 1,500 | 500 | 700 | 810 |
| 17T | 315 | 266 | 28 | 16 | 6 | 3,000 | 2,000 | 1,000 | 200 | 63 | 130 |
| 18H | 390 | 160 | 30 | 16 | 8 | 3,000 | 2,000 | 1,200 | 300 | 250 | 400 |
| 19H | 390 | 170 | 30 | 16 | 8 | 3,000 | 2,000 | 1,200 | 300 | 300 | 415 |
| 20S | 268 | 210 | 16 | 12¾ | 4 | 3,000 | 2,000 | 400 | 100 | 82 | 120 | that the water added in this stage—which stage takes from two to five minutes— be added at a greater rate than the formation adjacent the bore can accept. This provides for an accumulation of water in the interstices of the formation 22 above its static water level. The volume of the water so raised above the static water level is determined by direct measurement to be conical with the axis of the cone coaxial with the axis of the well bore. For this purpose the volumetric capacity of tank 56 needs to be no more than about 10,000 gallons although 8,000 gallon capacity is adequate. The accumulation of water above the static water level will be herebelow referred to as a "mound" although this is a mound of water in the interstices of a porous formation and not an accumulation of entirely unrestrained liquid. On the cessation of the height of the mound to continue to rise, although More broadly, the quantity of fluid Q delivered from the point of injection of fluid to the mound zone 82 in the period shown in FIGURES 1 and 2 wherein the mound is built up may be expressed as $$Q = K\left(\frac{\pi p (D^2 + d^2)}{\log_e (R/r)}\right)$$

where D is the distance from level 24 (the lower surface of the formation from which surface level the injected volume rises to level 48), d is the height of the mound 82, P is the pressure of liquid at surface 24, R is the radius of the cone or mound 82 from level 48, and r is the radius of the bore.

R may be estimated from (using data of Example 2 of Table I) assuming the mound to be conical and contain 6,000 gallons water and the specific yield of the formation to be 0.166 and the mound height being directly measured by an electric probe in annular zone 46

$$R = \sqrt{V/(1/3\ \pi\ h)}$$

$$= \left(\frac{6000 \text{ gallons} \times 1 \text{ cu. ft}/7.5 \text{ gal.}}{\dfrac{0.166 \text{ specific yield}}{1/3\pi\ 75 \text{ ft.}}}\right)^{(1/2)}$$

$$= 24.7 \text{ feet}$$

A greater radius "R" is required for influencing the desired radial flow of treating fluid from the well bore when the point of exit of that fluid into the formation is at a greater distance from the bottom of the mound.

While hydrochloric acid is used in the exemplary embodiments of Table I other acids and liquids particularly adapted to the characteristics of the formation to be treated may be used in place of hydrochloric acid and in combination therewith, e.g. hydrofluoric acid and kerosene (10%–20% by weight).

It is also within the scope of this invention that, as shown in FIGURE 5, a second pipe 92 is located in space 46 within casing 30. Pipe 92 extends above surface 32 and is there connected to a liquid reservoir tank 96 by a valve line 94. Pipe 92 has a plurality of outlet openings, 100, adjacent the lower portion of the formation 22. In this arrangement, the outlet 44 of line 42 (in impeller housing 12) may be raised in order to more selectively treat a portion of the zone radially removed from the bore 21 and with the lowest point of such zone portion being higher than the lowest portion of the zone treated in the process of FIGURES 1 through 4.

The tank 96 is of the same size as tank 56 above described, although the drawing thereof in FIGURES 5-8, being diagrammatic, shows both as reduced in size. The line 94 is provided with a valve 98 to control the flow of water therethrough. The location of the outlet openings 100 of line 92 provides for a flow of liquid upwardly as a stream at 90 as well as downwardly as stream 91. The vertical pressure developed by the streams limits flow of stream 88 from the outlet 44 at the same time that, as shown in FIGURES 3 and 5 the mound 82 and tank 54 are discharging liquid downwardly; the stream 88 of acid from line 42 is thereby constrained to not flow downwards even though there is not an impermeable stratum, as 28, below the level at which the treating fluid from tank 54 enters the formation 22; thereby the stream 88 of acid is driven radially outward.

The subsequent radial outward flow of water from tank 56 into line 42 drives the acid previously added to formation 22 rapidly further radially outward rather than dissipating the action of the acid in a zone adjacent the bore 21.

In the embodiment of operation illustrated in FIGURE 6, valve 98 is closed while the mound 82 is still discharging and before the displacement steps illustrated in FIGURE 4 are completed: thereby the mass of treatment fluid at 106 moved radially outward to zone 106 by the previous radial displacement action and located vertically by the balancing of stream 90 upward from orifices 100 and pressure of the liquid stream driven from the mound 82 is moved downward and outward as shown by arrow 108 by the direction of flow of the subsequent portion of the displacement stream 86 from bore 21 when the pressure of stream portion 90 is removed.

FIGURE 7 shows a modification of the operation of FIGURE 5. In the operation corresponding to this figure the liquid from chamber 96 is fed to zone 22 after the fluid stream presure from mound 82 has been dissipated. The mass of treatment fluid at 106 theretofore moved radially outward to zone 106 by the previous radial displacement action and located vertically by the balancing of the upwardly moving stream portion 90 and the pressure of the downwardly flowing liquid stream from mound 82 is moved upward and outward as shown by arrow 109 by the direction of flow of the subsequent portion of the displacement stream from bore 21 when the pressure of stream portion 90 on the displacement stream 86 is no longer opposed by the pressure developed by the stream from the mound 82.

FIGURE 8 shows a three pipe system: this system and structure is the same as the two pipe system shown in FIGURES 5-7 with the addition of a third line 110 in the space 46. Line 110 extends from above the surface to above the level of the outlet 44. At its upper end line 110 is connected to a tank 112 similar to tank 56 through a tank discharge line 114 and a valve 116. At its lower end line 110 has a plurality of openings 118.

According to the process of operation of this system, openings 118 and 100 are located as far apart as feasible; after the mound 82 is developed as shown in FIGURE 2, and some displacement stream as 86 of FIGURE 4 has been applied to the mass of acid, as 120, thereby rapidly located radially of the bore 21, valve 62 is closed and further radial movement of the mass 120 ceases. Thereupon the valve 98 is opened and flow of the liquid from tank 96 serves to drive the mass 120 upward; after the mass 120 has been displaced upward to vertically wash or treat a portion or zone of formation 22 theretofore above mass 120, the valve 98 is closed, valve 116 is open and the pressure from the fluid stream from line 110 causes the remainder of mass 120 to move downwards somewhat laterally of its previous upward path whereby a vertical zone 122 is vertically washed by flow control from the single well bore 21.

Although in accordance with the provisions of the patent statutes, particular preferred embodiments of this invention have been described and the principles of the invention have been described in the best mode in which it is now contemplated applying such principles, it will be understood that the processes shown and described are merely illustrative and that this invention is not limited thereto and, accordingly, alterations and modifications which readily suggest themselves to persons skilled in the art without departing from the true spirit of the disclosure hereinabove are intended to be included in the scope of the annexed claims.

It is to be specifically understood that the purpose of bringing the reactive agents, e.g. hydrochloric acid, to the zones described is to permit the agent to react with the debris and blocking agents located there, dissolve them and remove them and so enhance the productivity of the formation so treated as is done by the process and the results of which are described in Table I.

We claim:
1. Process for treating underground water-bearing formations adjacent to and radially spaced from a well bore, said well bore containing a perforated well casing passing through said formation and open thereto above and below the static water level in said formation and a conduit from the surface to said formation and within the said casing, comprising the steps of passing water down the well bore and into said formation above the static water level of said formation at a rate sufficient to form a cone of water in said formation above said static water level, passing a limited amount of formation treating agent down said conduit and injecting said agent into said formation beneath said cone while said cone of water is flowing downward in said formation, discontinuing the addition of the formation treating agent to said conduit and passing another liquid down said conduit and driving said treating liquid down said conduit and out of the conduit and into the formation while said cone of water theretofore above the static water level is flowing downward in said well and formation.

2. Process as in claim 1 wherein said water bearing formation overlies an impermeable formation, comprising the step of locating the cone of water above the static water level of said formation as aforesaid by the step of moving liquid down said conduit to the bottom of said well and up the well in the volume bounded by the casing.

3. Process as in claim 2 wherein water is passed downward of the conduit and into the well at a rate faster than the formation can accept the water added and discontinuing the addition of said water to the conduit prior to the addition of said agent to said conduit.

4. Process as in claim 1 wherein a second conduit is located in said casing and extends to below the lower opening of said first conduit wherein water is passed down said second conduit and into said formation below the first conduit opening while said agent is being injected into the formation.

5. Process as in claim 4 wherein water is passed into said second conduit during only the first portion of the period while the agent is being injected into the formation and the water from above the static water level enters the formation.

6. Process as in claim 4 wherein said water is passed into said second conduit for a period longer than that for which the liquor above the static water level enters the formation.

7. Process as in claim 4 wherein a third conduit is located in said casing and extends to above the level of the lower end of the first conduit and wherein, after said agent is introduced into said formation and moved radially from said bore, liquid is passed alternately down the second and third conduits and into the formation and moves the agent in alternate vertical directions.

References Cited

UNITED STATES PATENTS

| | | | |
|---|---|---|---|
| 1,891,667 | 12/1932 | Carr | 166—42 |
| 2,259,429 | 10/1941 | Simmons | 166—42 |
| 2,265,923 | 12/1941 | Normand | 166—42 |
| 2,347,615 | 4/1944 | Shelley. | |
| 2,907,390 | 10/1959 | Moll et al. | 166—44 |
| 3,115,931 | 12/1963 | McEver | 166—42 |
| 3,199,592 | 8/1965 | Jacob | 166—42 |

CHARLES E. O'CONNELL, *Primary Examiner.*

I. A. CALVERT, *Assistant Examiner.*